(12) United States Patent
Sugimoto

(10) Patent No.: US 7,706,006 B2
(45) Date of Patent: Apr. 27, 2010

(54) IMAGE READING APPARATUS AND INFORMATION PROCESSING APPARATUS

(75) Inventor: Tetsuya Sugimoto, Muko (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1445 days.

(21) Appl. No.: 11/011,069

(22) Filed: Dec. 15, 2004

(65) Prior Publication Data

US 2006/0087679 A1   Apr. 27, 2006

(30) Foreign Application Priority Data

Oct. 21, 2004   (JP)  ............... 2004-307131

(51) Int. Cl.
*H04N 1/04*   (2006.01)

(52) U.S. Cl. ............ 358/1.15; 358/1.13; 358/401; 358/474

(58) Field of Classification Search ............ 358/1.15, 358/1.13, 401, 474
See application file for complete search history.

(56) References Cited

U.S. PATENT DOCUMENTS

2004/0169881 A1 * 9/2004 Sato .............. 358/1.15

FOREIGN PATENT DOCUMENTS

| JP | 03-167679 | 7/1991 |
|----|-----------|--------|
| JP | 11-266354 A | 9/1999 |
| JP | 2002-112009 A | 4/2002 |
| JP | 2003-198770 A | 7/2003 |
| JP | 2004-165814 A | 6/2004 |

OTHER PUBLICATIONS

Notification of Reasons of Refusal issued Feb. 7, 2006 from the Japan Patent Office.

Notice of Reasons of Refusal issued Jun. 6, 2006 from the Japan Patent Office with its Engish Translation.

* cited by examiner

*Primary Examiner*—Houshang Safaipour
(74) *Attorney, Agent, or Firm*—Buchanan Ingersoll & Rooney PC

(57) ABSTRACT

In an image reading apparatus having an image reading device which reads a document to output an image data thereof, and an image processor which performs a processing of interest on the image data received from the image reading device, a decision device decides whether the image data should be processed by the image processor or not. When the image data should be processed by the image processor, a transmission device transmits the image data subjected to the processing of interest by the image processor, otherwise it transmits the image data not subjected to the processing of interest by the image processor.

15 Claims, 7 Drawing Sheets

IMAGE READING APPARATUS AND INFORMATION PROCESSING APPARATUS

This application is based on application No. 2004-307131 filed in Japan, the contents of which are hereby incorporated by reference.

BACKGROUND OF THE INVENTION

1. Field of the Invention

The present invention relates to image reading by designating scan parameters for reading image data.

2. Description of the Related Art

In a computer connected to an image reading apparatus such as a scanner, a scanner software in the computer sets scan parameters such as color type, resolution and size to the scanner to read an image of a document. For example, in an apparatus including a scanner and a display unit disclosed in Japanese Patent laid open Publication 3-167679/1991, an image of a document is read by the scanner and stored in a memory device. However, when an image of a document of maximum size or the like is read by the scanner but the scan direction does not coincide with the display direction for the document, the document size and portrait/landscape are specified, and a scanned image data is rotated in accordance with the specified conditions and stored in the memory device. Thus the document image in the desired direction is displayed without considering the direction of the document.

In a conventional scanner software and a conventional scanner device, however, the image data read by the scanner is processed at a side decided previously among the scanner software and the scanner. Therefore, when the processing is performed by the side having an inferior performance, there is a problem that a processing time such as image data transmission time increases or the data transfer (traffic) increases in the network including the scanner and the scanner software. Moreover, when an image is read by an image reading apparatus, a wait time may happen for processing other jobs and this may delay the processing. Moreover, when a plurality of scanner devices having different performance are available, it is a problem that a scanner software in correspondence to each scanner device has to be provided for the computer. Therefore, it is desirable to process an image efficiently in the system including the scanner and the computer.

SUMMARY OF THE INVENTION

It is an object of the present invention to process an image efficiently in a system including the scanner device and the computer.

In one aspect of the invention, an image reading apparatus has an image reading device which reads a document to output an image data thereof, and an image processor which performs a processing of interest on the image data received from the image reading device. A decision device decides whether the image data should be processed by said image processor or not. When the decision device decides that the image data should be processed by the image processor, a transmission device transmits the image data subjected to the processing of interest by the image processor, otherwise it transmits the image data not subjected to the processing of interest by said image processor.

In another aspect of the invention, an information processing apparatus which instructs an image reading apparatus to send image data subjected to a processing of interest has an inquiry device which inquires of the image reading apparatus whether the processing of interest can be performed by the image reading apparatus. An instructor instructs the image reading apparatus to transmit the image data on which the processing of interest is performed when receiving a replay that the processing of interest can be executed by the image reading apparatus and instructs the image reading apparatus to transmit the image data on which the processing of interest is not performed when receiving a reply that the processing of interest cannot be executed by the image reading apparatus. A receive device receives the image data in correspondence to the instruction by the inquiry device from the image reading apparatus; and an image processor performs the processing of interest on the image data when receiving the image data on which the processing of interest is not performed from the receiving device.

In a further aspect of the invention, an information processing apparatus connected to an image reading apparatus which can perform a processing of interest on image data has an image processor which performs the processing of interest on the image data. A decision device decides whether the processing of interest on the image data should be processed by the image processor or not. An instructor instructs the image reading apparatus to transmit the image data on which the processing of interest is performed when the decision device decides that the processing of interest on the image data should be processed by said image reading apparatus and instructs the image reading apparatus to transmit the image data on which the processing of interest is not performed when said decision device decides that the processing of interest on the image data should be processed by the image processor. Then, a receive device receives the image data from the image reading apparatus in correspondence to the instruction by said instructor. Thus, the image processor performs the processing of interest on the image data when the receive device receives the image data not subjected to the processing of interest.

It is an advantage of the invention that resources of the image reading apparatus and the information processing apparatus can be used efficiently.

BRIEF EXPLANATION OF THE DRAWINGS

These and other objects and features of the present invention will become clear from the following description taken in conjunction with the preferred embodiments thereof with reference to the accompanying drawings, and in which.

DESCRIPTION OF THE PREFERRED EMBODIMENTS

Figure 1:
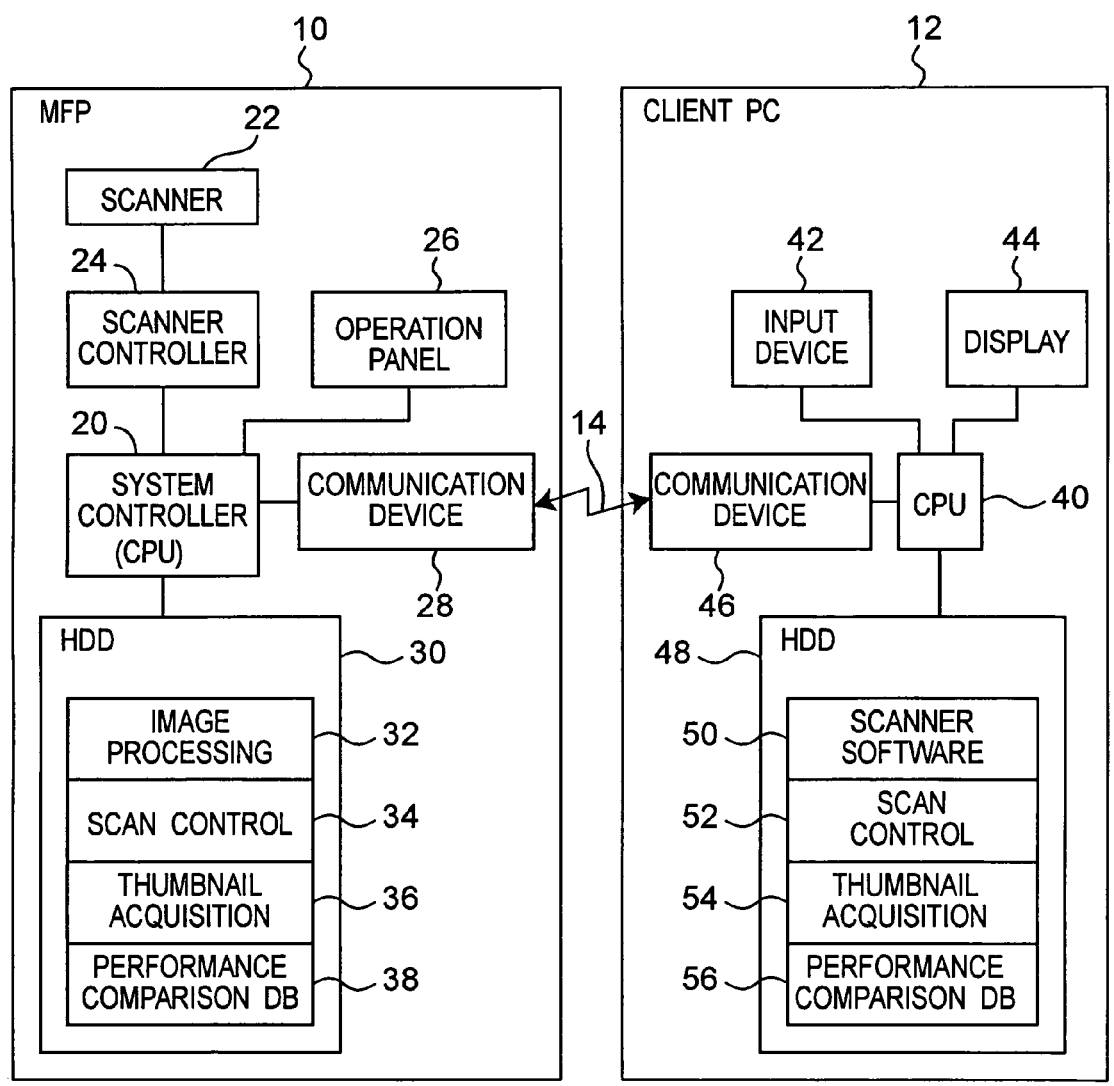
FIG. 1 is a block diagram of a system including a multi-functional peripheral and a computer.

Referring now to the drawings, wherein like reference characters designate like or corresponding parts throughout the several views, FIG. 1 shows a system in which a multi-functional peripheral (hereinafter referred to as MFP) 10 and a computer 12 serving as an information processing apparatus are connected to each other locally or through a network 14 such as LAN. The MFP 10 performs a processing instructed by the computer 12 through the network 14. The MFP 10 is a device having many functions such as a printer, a scanner and a facsimile apparatus. In this embodiment, the computer 12 uses the MFP 10 as an image reading apparatus for reading an image of a document. For example, a scanner software in the computer 12 makes the MFP 10 read image data by specifying scan parameters such as color type, resolution, and size. The system may include a plurality of information processing apparatuses and a plurality of image reading apparatuses.

A configuration of the MFP 10 is described below. The MFP 10 has a system controller 20 (including a central processing unit) for controlling the entire apparatus. An operation panel 28 displays various screens for user interface on a display unit and receives various instructions and input data from a user. When the MFP 10 is operated as an image reading apparatus, a scanner device 22 reads an image of a document under the control by a scanner controller 24. A communication device 30 performs communication through the network 14. An image processing program 32, a scan control program 34, a thumb-nail acquisition program 36, and a performance comparison database 38 are stored in a hard disk drive 30 in addition to the image data read by the scanner device 22. Various specifications, memory capacity, resolution conversion speed, multitask performance of an application specific integrated circuit (ASIC) for image processing in the scanner controller 24, and the specifications of the central processing unit (CPU) 40 of the computer 12 are stored in the performance comparison database 38. As will be explained later, when a processing of interest on the image data is instructed by the computer 12, the scan control program 34 or the thumb-nail acquisition program 36 refers to the performance comparison database 38 to decide which of the MFP 10 and the computer 12 performs the processing. The programs 34 and 36 are examples of image processing capable of performing the processing of interest for image data. In FIG. 1, a print function and a fax function provided in the MFP 10 but not relevant to the invention are not illustrated.

The above-mentioned "processing of interest" generally represents any image processing whose processing time would be different when performed by the MFP 10 or by the computer 12. As examples of the processing of interest, rotation and resolution conversion are described below. Further, the processing of interest may be a ground processing or a processing such as masking or marker color conversion which uses a memory device.

In the computer 12, as shown in FIG. 1, the CPU 40 for controlling the entire computer is connected to an input device 42 such as a keyboard or a mouse, a display unit 44, a communication device 46, a hard disk drive 48 and the like. This configuration is similar to that of a conventional personal computer. The computer 12 communicates with the MFP 10 through the communication devices 46 and 28. A scan control program 52, a thumb-nail acquisition program 54, and a performance comparison database 56 are stored in the hard disk drive 48 in addition to a scanner software including an image processing. Various specifications, memory capacity, resolution conversion speed, multitask performance of an ASIC for image processing in the MFP 10, and the specifications of the CPU 40 are stored in the performance comparison database 56. By referring to the performance comparison database 56, it can be decided which of the computer and the MFP should perform a processing of interest, without inquiring the MFP 10.

In the system explained above, an image is read by the MFP 10, and the image data is transmitted to the computer 12. It is decided which of the information processing apparatus (computer 12) and the image reading apparatus (MFP 10) should perform a processing of interest in accordance with the performance of the MFP and the current load to be performed thereby, by using the scan control program 34 and the performance comparison database 38 in the MFP 10 or by using the scan control program 52 and the performance comparison database 56 in the computer 12. Then, the processing is executed in accordance with the decision. Therefore, it is possible to efficiently process image data by effectively using resources of the MFP 10 and the computer 12. Examples are explained below.

A system of a first embodiment is described below. In this system, the processing of interest is rotation of an image. A scan condition is set by the computer 12 by inquiring of the MFP 10 whether the rotation can be performed thereby. In this case, the performance comparison database 56 of the MFP 10 is referred to.

In the system shown in FIG. 1, the computer 12 serving as an information processing apparatus can instruct the MFP 10 storing the read image data through the network 14 to transmit the image data on which the processing of interest should be performed. In this case, the computer 12 inquires which of the MFP 10 and the computer 12 the instructed processing of interest should be performed by. Then, the MFP 10 decides whether it should perform the processing of interest or not, and returns a reply of the decision to the computer 12. When the computer 12 receives a reply that the processing should be performed by the MFP 10, it instructs the MFP 10 to transmit the image data on which the processing of interest has been performed, while when a reply is received that the processing of interest cannot be performed by the MFP 10, it instructs the MFP 10 to transmit image data on which the processing of interest is not performed. When the MFP 10 decides to perform the processing of interest by itself, it performs the processing of interest on image data and transmits the processed image data to the computer 12. However, when the MFP 10 decides not to perform the processing of interest by itself, it transmits the image data to the computer 12 without processing the image data. Then, the computer 12 receives the image data and performs the processing on the image data.

A case is described below in which the processing of interest instructed by the computer 12 is image rotation. When a document set on the scanner 22 is read, it may be necessary to rotate the read image data of the document so as to face the scanned image correctly (that is, to rotate the image in the correct direction), in connection with the direction set to the document. However, when the MFP 10 cannot rotate the image or the rotation performance of the CPU is inferior to that of MFP 10, or the rotation cannot be run immediately because of the load to be executed, the rotation cannot be performed or the rotation takes a long time. In such a case, the rotation should be performed by the computer 12 in order to decrease the total processing time or to decrease the load to be performed to the MFP 10.

In order to perform the above-mentioned operation simply, when the MFP 10 cannot rotate an image, the MFP 10 sends the image data together with a rotation angle (such as 90°) for rotating the image data, and the scan control program 52 in the PC 12 rotates the image in accordance with the rotation angle received from the MFP 10. When the rotation by the computer becomes unnecessary because the rotation can be performed by the MFP 10, rotation angle of 0° is sent together with the rotated image. The rotation angle for the image so as to put the image correctly can be calculated by the MFP 10 according to the type and the direction of a document, or by using automatic recognition of top and bottom of the document. Alternatively, a user may instruct the rotation angle with the scanner software 50 in the computer 12. When the rotation is performed by the MFP 10, rotation angle of 0° is returned, while when the rotation cannot be performed by the MFP 10, the rotation angle instructed by the scanner software 50 in the computer 12 is returned.

Figure 2:
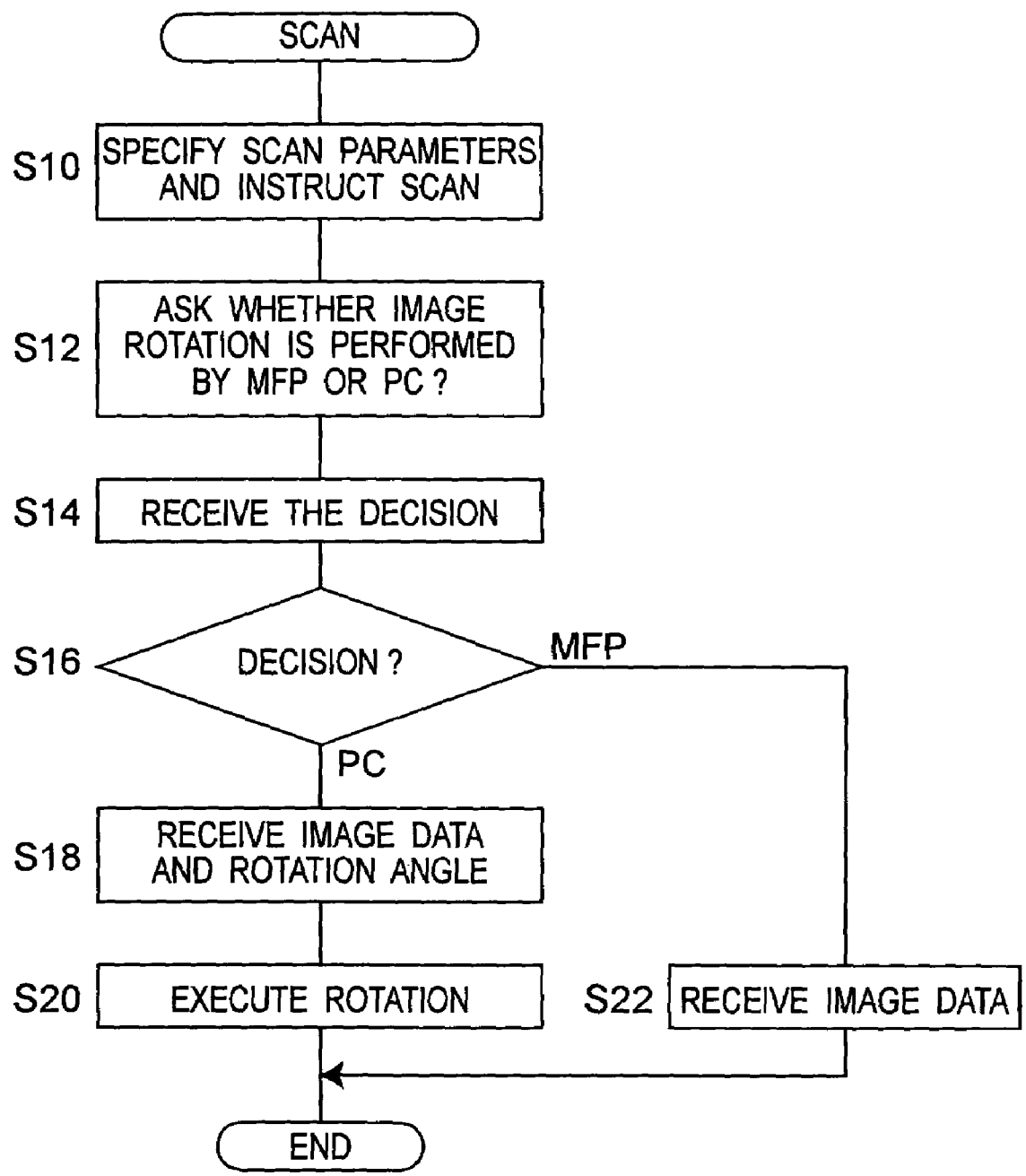
FIG. 2 is a flowchart for scanner control of a central processing unit in the computer.

FIG. 2 is a flowchart of the scan control program 52 in the computer 12. First, scan parameters such as paper size and direction of a document along which the document is put are specified for the MFP 10, and an instruction is sent for starting a scan (S10). Next, when rotation of image data is necessary, it is asked the MFP 10 which of the MFP 10 and the computer 12 should perform the image rotation (S12), and a reply of the decision of the MFP 10 is received (S14). When the decision that the rotation should be performed by the MFP 10 is received, the image data processed by the MFP 10 is received (S16), and the flow branches according to the decision. When the decision that the rotation should be performed by the MFP 10 is received, the image data on which the rotation has not yet been performed and a rotation angle for the image data are received from the MFP 10 (S18), and the image data is rotated by the rotation angle for the image data by the scanner software 50 (S20). When the rotation is not performed by the computer, the image data rotated by the MFP 10 is received from the MFP 10 (S22).

Figure 3:
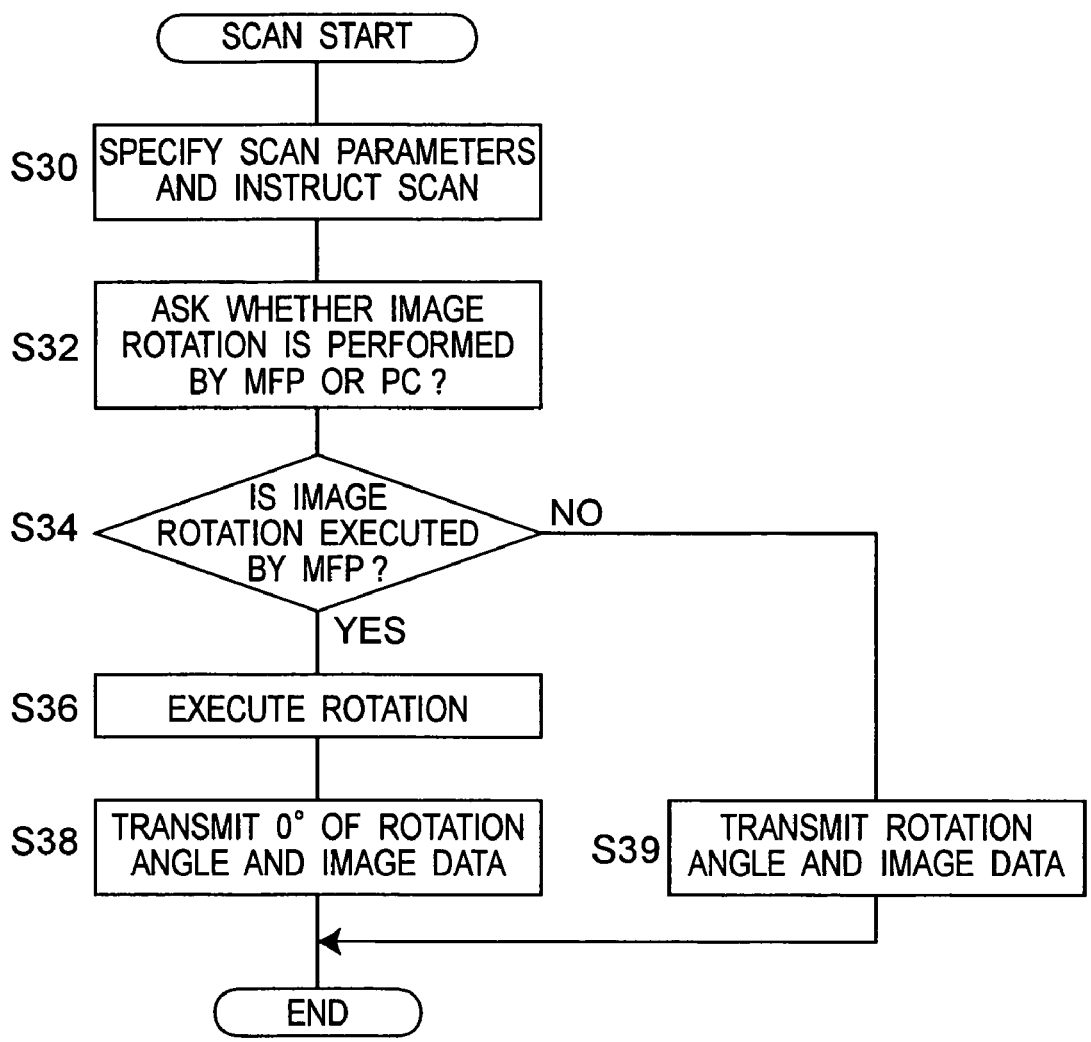
FIG. 3 is a flowchart for the scanner control of the system controller in the multi-functional peripheral.

FIG. 3 is a flowchart of the scan control program 34 in the MFP 10. When scan parameters such as paper size and direction of a document along which the document-are specified and an instruction for scan start is received from the computer 12, a scan of the document is started by the scanner 22 to read image data (S30). When image rotation is necessary, it is decided which of the MFP 10 and the computer 12 should perform the image rotation, by referring to the performance comparison database 48 (S32). When the rotation should be executed by the MFP 10 (YES in S34), the image is rotated by a rotation angle on the scanned image data in order to put the image correctly (S36), and the rotated image data and rotation angle of 0° are transmitted to the computer 12 (S38). When the rotation should be performed by the computer 12, the image data obtained by the scan but not rotated is transmitted to the computer 12 together with rotation angle calculated in accordance with the scan parameters (S39).

Alternatively, the computer 12 inquires of MFP 10 only the information whether the processing of interest can be performed by the MFP 10 or not and whether the current load to be performed by the MFP 10 is high or not. Then the computer 12 can decide whether the processing should be performed by the MFP 10 or by computer 12, in accordance with the information.

Alternatively, the computer 12 is allowed to perform the rotation when receiving image data and non-zero rotation angle for the image data for the image data from the MFP 10, without receiving the decision from the MFP 10. In other words, it is possible to decide whether it is necessary to rotate the image data or not, according as the rotation angle for the image data is non-zero or not.

Furthermore, in the above-mentioned example, scan conditions are set by the computer 12. However, the MFP 10 can set scan conditions including setting conditions of the computer 12 as a destination, can decide which of the computer 12 and the MFP 10 should perform the instructed processing and transmits the decision and the image data to the computer 12.

Next, a system of a second embodiment is described. In this system, the processing of interest is acquisition of thumb-nail images. To prepare thumb nail images which are small images having a low resolution, a resolution conversion function is necessary. The computer 12 requests thumb-nail images and inquires of the MFP 10 whether the resolution conversion of image data can be performed by the MFP 10. In this example, the MFP 10 and the computer 12 have the configurations shown in FIG. 1.

Creation of the thumb-nail images is described below. The scanner software 50 for obtaining images stored in a hard disk drive 42 in the MFP 10 displays a list of images stored in the MFP 10 in the screen of the operation panel 28 as thumb nail images, so that a user can easily understand the images. In order to display the thumb-nail images, because the image data obtained at a high resolution are stored in the MFP 10, it is necessary to create the thumb-nail images by the MFP 10 or by the computer 12 (the scanner software 50). Which of the MFP 10 and the computer 12 should create the thumb-nail images is decided based on whether the MFP 10 has the image size conversion capability or not; the specifications of the CPU, and the load to be performed by the MFP 10.

When the scanner software 50 in the computer 12 requests the thumb-nail images, it is inquired whether the image size can be converted by the MFP 10. When the image size can be converted, the scanner software 50 requests the images having a low resolution. On the other hand, when the image resolution cannot be converted by the MFP 10, the image data of the as-stored resolution stored in the hard disk drive 30 and the resolution value are transmitted to the scanner software 50. The scanner software 50 decides whether the size conversion is necessary or not from the resolution of the received images, and it processes the image data if necessary. On the other hand, when the MFP 10 can perform the image size conversion, it transmits the thumb-nail images with a resolution after the image conversion to the scanner software 50.

Figure 4:
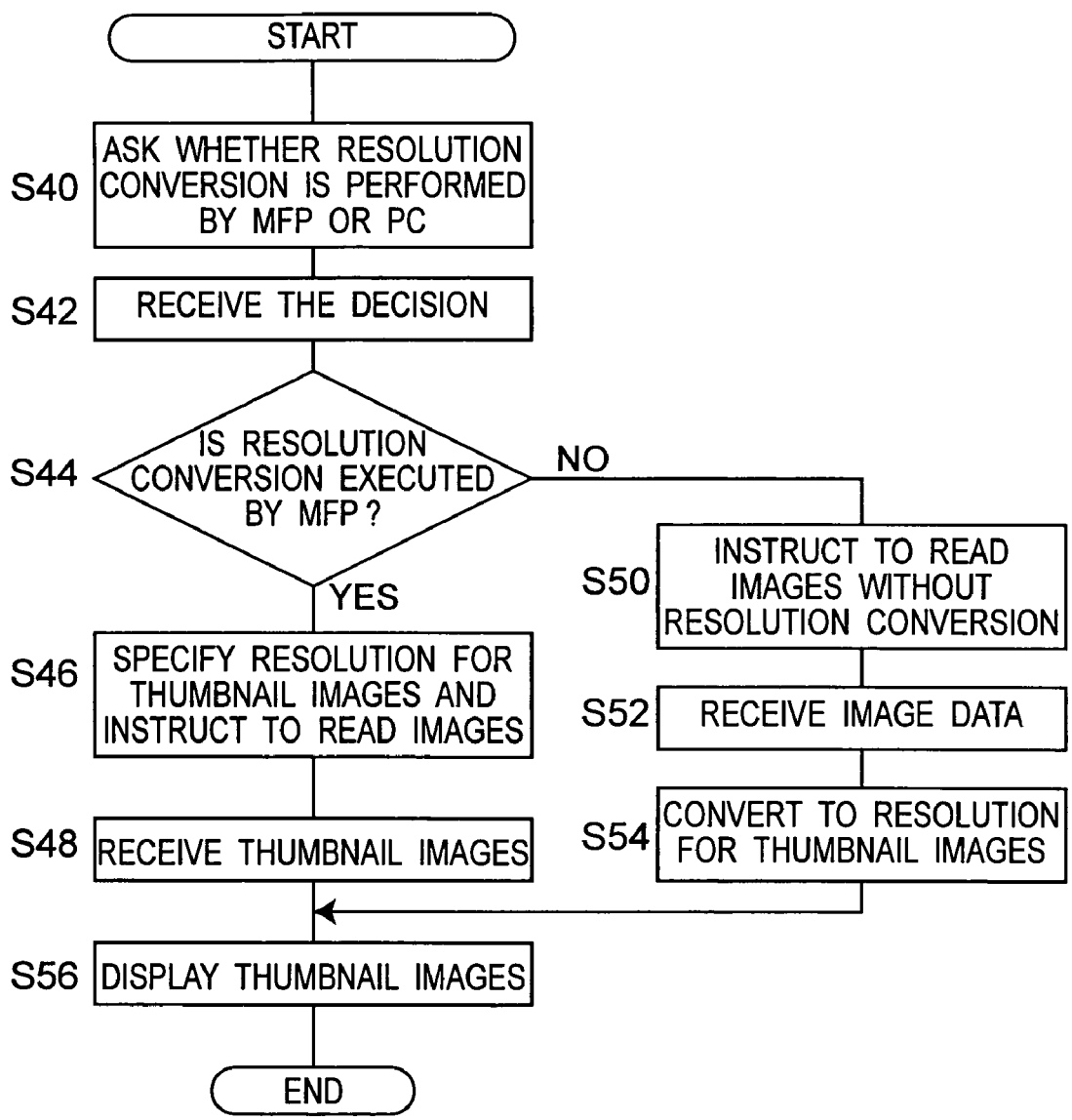
FIG. 4 is a flowchart of thumb-nail acquisition sequence of the central processing unit in the computer.
Figure 5:
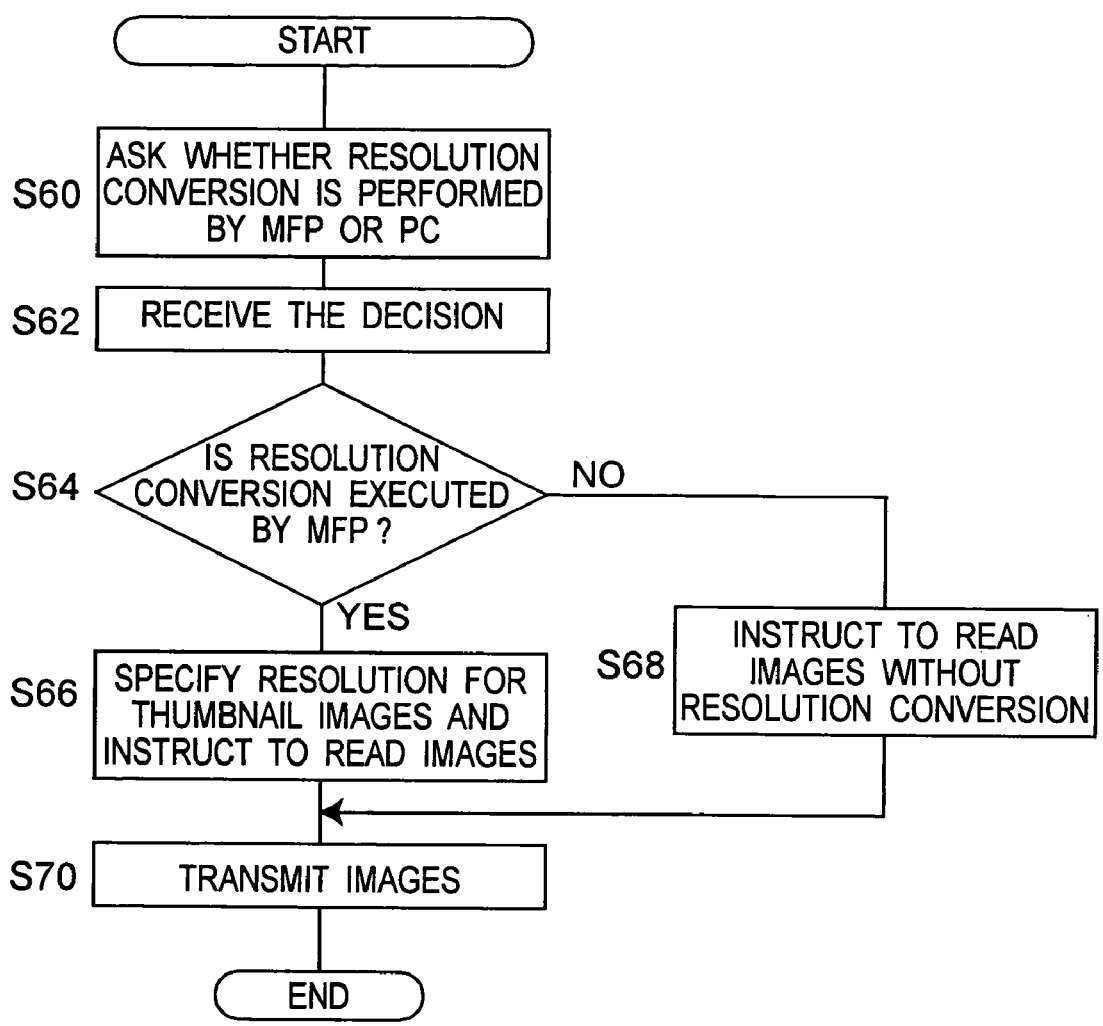
FIG. 5 is a flowchart of the thumb-nail acquisition of the system controller in the multi-functional peripheral.

Next, thumb-nail acquisition processing is described by referring to FIGS. 4 and 5. FIG. 4 is a flowchart of the thumb-nail acquisition program 54 in the computer 12. When the thumb-nail acquisition is started, it is asked the MFP 10 whether resolution conversion should be performed by the MFP 10 or by the computer 12 (S40), and a reply of the decision is received from the MFP 10 (S42). When the decision that the resolution should be converted by the MFP 10 is received (YES in step 44), the resolution for the thumb-nail images is specified and it is instructed to read and transmit the images (S46). Then, thumb-nail images converted to the thumb-nail resolution are received (S48). On the other hand, when the resolution should not be converted by the MFP 10, it is instructed to read and transmit the images without the resolution conversion (S50). Then, the image data for the resolution of the image as stored in the MFP 10 are received (S52), and they are converted to the thumb-nail resolution (S54). Then, the obtained images are displayed as the thumb nail images (S56).

Furthermore, FIG. 5 is a flowchart of the thumb-nail acquisition program 36 in the MFP 10. When it is asked by the computer 12 whether the resolution conversion can be performed by the MFP 10 or by the computer 12 (S60), it is decided whether the resolution should be converted by the MFP 10 or by the computer 12, in accordance with the performance comparison database 38, and a reply of the decision is returned to the computer 12 (S62). When the computer 12 instructs read on images specified with the thumb-nail resolution or to execute resolution conversion (YES in S64), the images are converted to images having a low resolution in correspondence to the thumb-nail resolution (S66), and the images are transmitted to the computer 12 (S70). On the other hand, when the image should not be converted by the MFP 10

(NO in S64), the image data as stored in the MFP 10 with the original resolution are read (S68), and they are transmitted to the computer 12 (S70).

Alternatively, it may be inquired of the MFP 10 only the information on whether the MFP 10 has a capability for performing the resolution conversion and whether the load to be performed by the MFP 10 is high or not. The computer 12 can decide whether the resolution conversion should be performed by the MFP 10 or by the computer 12, based on the received information.

Alternatively, it can be decided whether the computer 12 should perform the resolution conversion, based on the size of the data transmitted from the MFP 10, without receiving a reply of the decision on whether the MFP 10 should perform the resolution conversion or not. The computer 12 can decide in accordance with the size of the received data whether the resolution conversion should be performed by the MFP 10 or by the computer 12.

Next, a system of a third embodiment is described below. The processing of interest is the thumb-nail acquisition, similarly to the second embodiment. In this embodiment, the computer 12 decides which of the MFP 10 and the computer 12 should perform the resolution conversion when thumb-nail images are requested. In this example, the MFP 10 and the computer 12 have the configurations shown in FIG. 1.

Figure 6:
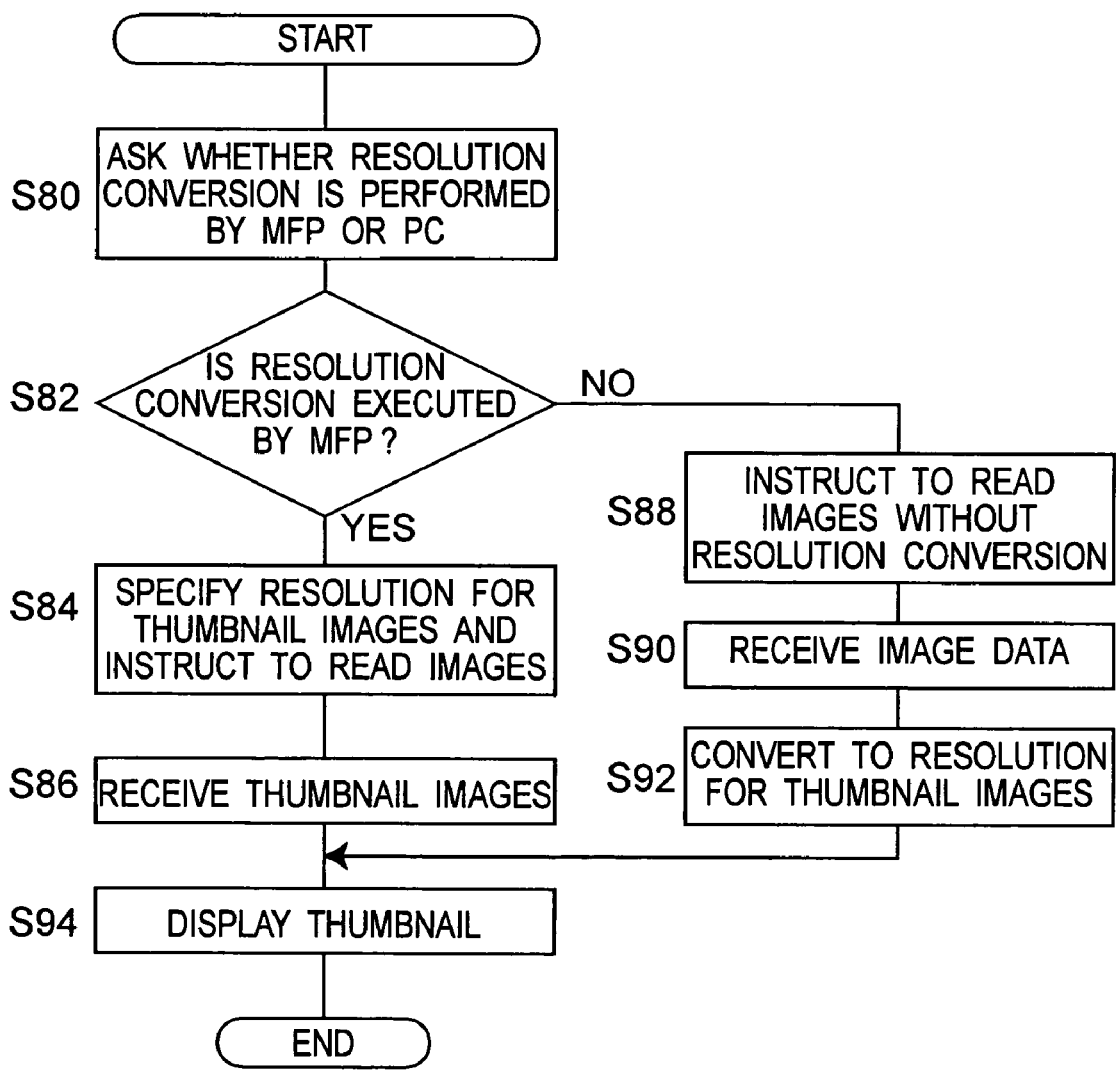
FIG. 6 is a flowchart of the thumb-nail acquisition of the system controller of the central processing unit in the computer.

The thumb-nail acquisition processing is described below by referring to FIGS. 6 and 7. FIG. 6 is a flowchart of the thumb-nail acquisition program 54 in the computer 12. When the thumb-nail acquisition is started, it is asked by the MFP 10 whether the MFP 10 should perform the resolution conversion or not, and the question is answered with reference to the performance comparison database 56 (S80). When it is decided that the MFP 10 should convert the resolution (YES in S82), the thumb-nail resolution is specified, and it is instructed to read and to transmit the images (S84). Then, the thumb nail images with the thumb-nail resolution are received from the MFP 10 (S86). On the other hand, when it is decided that the MFP 10 should not perform the resolution conversion, it is instructed to read and transmit the images without the resolution conversion (S88). Then, the image data with the resolutions as stored in the MFP 10 are received from the MFP 10 (S90), and they are converted to images with the thumb-nail resolution (S92). Then, the obtained images are displayed as thumb nail images (S94).

Figure 7:
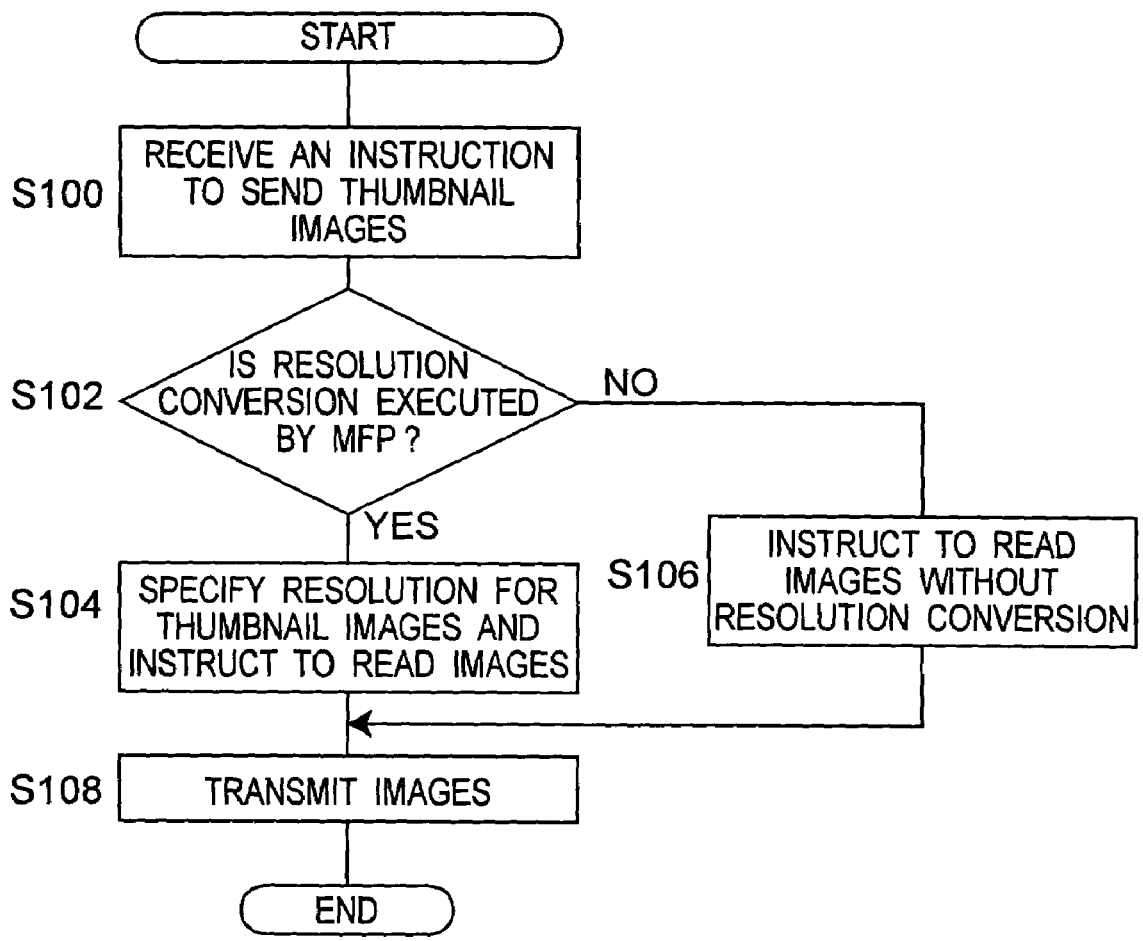
FIG. 7 is a flowchart of the thumb-nail acquisition of the system controller in the multi-functional peripheral.

FIG. 7 is a flowchart of the thumb-nail acquisition program 36 in the system controller 20 in the MFP 10. An instruction for transmission of the thumb-nail images is received from the computer 12 (S100). When the computer 12 instructs transmit the images with the thumb-nail resolution, that is, when the instruction includes the resolution conversion by the MFP 10 (YES at S102), the thumb-nail resolution is specified, the as-stored images are converted to images having the low resolution (S104), and they are transmitted to the computer 12 (S108). On the other hand, when the instruction does not include the resolution conversion (NO at S102), the image data as stored in the MFP 10 are read with the as-stored resolution (S106) and they are transmitted to the computer 12 (S108).

Next, another case is described below of deciding in accordance with the image processing speed which of the MFP 10 and the computer 12 should perform the processing of interest. The image processing speed can be decided by comparing specifications of the CPUs. The specifications of the CPU in the computer 12 is previously communicated to the MFP 10 in the procedure of a communication with the computer 12. The MFP 10 compares the CPU 40 in the computer 12 with the CPU in the MFP 10 by referring to the performance comparison database 38 previously set in the MFP 10 and decides which of the MFP 10 and the computer 12 should perform the processing. Because flowcharts for the control in accordance with the decision of the MFP 10 and the computer 12 are similar to those of the above example, the explanation thereof is omitted here.

In the above-mentioned first to the third embodiments, it is mainly decided which of the MFP 10 and the computer 12 should perform the processing of interest, depending on which has the capability for the desired processing of interest such as image processing. However, there is also a case that both sides have the capability of the processing, but the degree or quality of the performance is different. In this case, it is decided by comparing the performance which side should perform the processing.

Alternatively, it may be decided based on the load to be performed by the MFP 10 whether the MFP 10 can perform the processing of interest even if both sides have sufficient performance. In an example, the load to be performed is decided by comparing it with a predetermined standard time. For example, when the scanner in the MFP 10 has the performance according to the specifications, memory capacity, and reference time of resolution conversion of the ASIC for image processing, but it cannot perform the processing within the standard time, it cannot immediately perform the processing. Then, it is decided that the processing of interest should not be performed by the MFP 10, by considering that the current load to be performed does not allow the MFP 10 to perform the processing. In another example, a number of tasks to be executed by the MFP 10 capable of performing the multitask is previously set as a threshold value, and when tasks equal to or more than the specified number are to be executed, it is decided that the MFP should not perform the processing of interest (a task).

As explained above, in the above-mentioned embodiments, it is decided whether the image reading apparatus should perform a processing of interest in accordance with the performance of the image reading apparatus and of the information processing apparatus and/or the load to be performed of the image processing apparatus. Thus, it is possible to effectively use the resources of the image reading apparatus and the information processing apparatus in order to process an image efficiently. For example, it is possible to improve the efficiency for image capture. Moreover, it is possible to flexibly deal with image reading apparatuses having different performance.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reading apparatus comprising:
   an image reading device which reads a document to output an image data thereof;
   an image processor which performs a transformational processing of interest on the image data received from said image reading device;
   a decision device which decides whether the image data should be processed by said image processor or not based on information relating to image processing performance of at least one of said image reading device processor and an external device; and a transmission device which transmits to the external device processed image data, which is based on the image data processed by the transformational processing of interest by said image processor, when said decision device decides that the image data should be processed by said image processor and transmits the image data, which is not processed by the transformational processing of interest by said image processor, when said decision device does not decide that the image data should be processed by said image processor.

2. The image reading apparatus according to claim 1, wherein said decision device decides whether the image data should be processed by said image processor or not, with reference to performance of said image processor or load to be performed thereby.

3. The image reading apparatus according to claim 1, further comprising a receive device which receives an instruction of the transformational processing of interest from an external image processor connected to said transmission device.

4. The image reading apparatus according to claim 1, wherein the transformational processing of interest is resolution conversion for changing the resolution of the image data.

5. The image reading apparatus according to claim 1, wherein the transformational processing of interest is rotation of the image data.

6. The image reading apparatus according to claim 5, wherein when said decision device decides that the image data should not be processed by said image processor, said transmission device transmits the image data not subjected to the transformational processing of interest by said image processor and an angle to be rotated.

7. An information reading and processing network comprising an information processing apparatus connected to an image reading apparatus, the information reading and processing network comprising:
  an image reading device which reads a document to output an image data;
  a performance comparison unit which compares performance of the information processing apparatus and the image reading apparatus;
  a decision device which decides whether the image data should be processed by the information processing apparatus or the image reading apparatus based on output of the performance comparison unit;
  an image processor which performs a transformational processing of interest on the image data received from said image reading device;
  a transmission device which transmits processed image data, which is based on the image data processed by the transformational processing of interest by the image reading apparatus, when the decision device decides that the image data should be processed by the image reading apparatus, and transmits the image data, which is not subjected to the transformational processing of interest by the image reading apparatus, when said decision device decides that the image data should be processed by said information processing apparatus;
  a second transmission device which receives the image data from the image reading apparatus; and
  a second image processor which performs the transformational processing of interest on the image data received from said image reading apparatus when the image data have not yet been subjected to the transformational processing of interest.

8. An information processing apparatus which instructs an image reading apparatus to send image data subjected to a processing of interest, the information processing apparatus comprising:
  an inquiry device which inquires of the image reading apparatus whether the transformational processing of interest can be performed by the image reading apparatus;
  an instructor which instructs the image reading apparatus to transmit processed image data, which is based on the image data processed by the transformational processing of interest, when receiving a reply that the transformational processing of interest can be executed by the image reading apparatus and instructs the image reading apparatus to transmit the image data, on which the transformational processing of interest is not performed, when receiving a reply that the transformational processing of interest cannot be executed by the image reading apparatus;
  a receive device which receives the image data in correspondence to the instruction by said inquiry device from the image reading apparatus; and
  an image processor which performs the transformational processing of interest on the image data when receiving the image data on which the transformational processing of interest is not performed from the receive device.

9. An information processing apparatus connected to an image reading apparatus which can perform a transformational processing of interest on image data, the information processing apparatus comprising:
  an image processor which performs the transformational processing of interest on the image data;
  a decision device which decides whether the transformational processing of interest on the image data should be processed by said image processor or said image reading apparatus based on information relating to image processing performance of at least one of said image processor and an external device
  an instructor which instructs the image reading apparatus to transmit to the external device processed image data, which is based on the image data processed by the transformational processing of interest, when said decision device decides that the transformational processing of interest on the image data should be processed by said image reading apparatus, and instructs the image reading apparatus to transmit the image data, on which the transformational processing of interest is not performed, when said decision device decides that the transformational processing of interest on the image data should be processed by said image processor;
  a receive device which receives the image data from the image reading apparatus in correspondence to the instruction by said instructor;
  wherein said image processor performs the transformational processing of interest on the image data when said receive device receives the image data not subjected to the transformational processing of interest.

10. The information processing apparatus according to claim 9, wherein said decision device decides whether the image data should be processed by said image processor or said image reading apparatus, with reference to performance of said image processor or load thereof to be processed.

11. The information processing apparatus according to claim 9, wherein the transformational processing of interest is resolution conversion for changing the resolution of the image data.

12. The information processing apparatus according to claim 9, wherein the transformational processing of interest is rotation of the image data.

13. The information processing apparatus according to claim 9, wherein when said decision device decides that the transformational processing of interest on the image data should be processed by said image processor, said receive device receives the image data not subjected to the transformational processing of interest and an angle to be rotated, and said image processor performs rotation of the image data received by said receive device based on the angle received by said received device.

14. A computer readable medium that includes a program executable by a computer connected to an image reading apparatus, the program comprising the steps of:

inquiring the image reading apparatus about whether a transformational processing of interest can be executed by the image reading apparatus;

instructing the image reading apparatus to transmit processed image data which is based on image data processed by the transformational processing of interest, when receiving a reply that the transformational processing of interest can be executed by the image reading apparatus and to transmit the image data, on which the transformational processing of interest is not performed, when receiving a reply that the transformational processing of interest cannot be performed by the image reading apparatus;

receiving the image data or the processed image data from the image reading apparatus in correspondence to the instruction; and performing the transformational processing of interest on the image data when the received image data is the image data on which the transformational processing of interest is not performed.

15. A computer readable medium that includes a program executable by a computer connected to an image reading apparatus which can perform a transformational processing of interest on image data, the program comprising the steps of:

deciding whether the transformational processing of interest should be performed by the image reading apparatus or by an image processing device of the computer which can perform the transformational processing of interest on the image data based on information relating to performance of at least one of the image reading apparatus and the image processing device of the computer;

instructing the image reading apparatus to transmit process image data, which is based on the image data processed by the transformational processing of interest, when it is decided that the transformational processing of interest should be performed by the image reading apparatus and to transmit the image data, on which the transformational processing of interest is not performed, when the transformational processing of interest should be performed by the image processing device;

receiving the image data or the processed image data from the image reading apparatus in correspondence to the instruction;

performing the transformational processing of interest on the image data when the image data received from the image reading apparatus is the image data on which the transformational processing of interest is not performed.

* * * * *